US007107259B2

(12) United States Patent
Gayama

(10) Patent No.: US 7,107,259 B2
(45) Date of Patent: Sep. 12, 2006

(54) INFORMATION PROCESSING APPARATUS AND INFORMATION PROCESSING METHOD

(75) Inventor: Shinichi Gayama, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 267 days.

(21) Appl. No.: 10/107,438

(22) Filed: Mar. 28, 2002

(65) Prior Publication Data

US 2002/0156830 A1 Oct. 24, 2002

(30) Foreign Application Priority Data

Mar. 29, 2001 (JP) ............................. P2001-094713

(51) Int. Cl.
 G06F 17/00 (2006.01)
 G06F 7/00 (2006.01)

(52) U.S. Cl. .................... 707/3; 707/4; 707/5; 709/201

(58) Field of Classification Search ................ 707/3–7, 707/100–102, 201, 104.1, 9, 10, 206, 200; 709/206, 245, 201–202; 705/1, 26; 701/201, 701/213; 345/173, 536
See application file for complete search history.

(56) References Cited

U.S. PATENT DOCUMENTS

| | | | | |
|---|---|---|---|---|
| 5,422,816 A | * | 6/1995 | Sprague et al. | 455/556.2 |
| 5,455,906 A | * | 10/1995 | Usuda | 345/536 |
| 5,754,938 A | * | 5/1998 | Herz et al. | 725/116 |
| 5,924,090 A | * | 7/1999 | Krellenstein | 707/5 |
| 5,948,040 A | * | 9/1999 | DeLorme et al. | 701/201 |
| 5,974,388 A | * | 10/1999 | Durham | 705/1 |
| 6,529,136 B1 | * | 3/2003 | Cao et al. | 340/686.1 |
| 6,549,915 B1 | * | 4/2003 | Abbott et al. | 707/104.1 |
| 6,756,972 B1 | * | 6/2004 | Komatsu et al. | 345/173 |
| 6,840,442 B1 | * | 1/2005 | Swaminathan et al. | 235/380 |
| 2002/0016786 A1 | * | 2/2002 | Pitkow et al. | 707/3 |
| 2002/0103789 A1 | * | 8/2002 | Turbull et al. | 707/3 |
| 2002/0126120 A1 | * | 9/2002 | Snowdon et al. | 345/440 |

* cited by examiner

Primary Examiner—Greta Robinson
Assistant Examiner—Jacques Veillard
(74) Attorney, Agent, or Firm—Nixon & Vanderhye, PC

(57) ABSTRACT

In an example information processing apparatus, three information groups divided by type into general information, system-inherent information, and user information, are utilized to give operational directions. The information processing apparatus selects one or more best information from a plurality of input information based on the three information groups, whereby the best information can be selected with flexibility and high reliability.

19 Claims, 13 Drawing Sheets

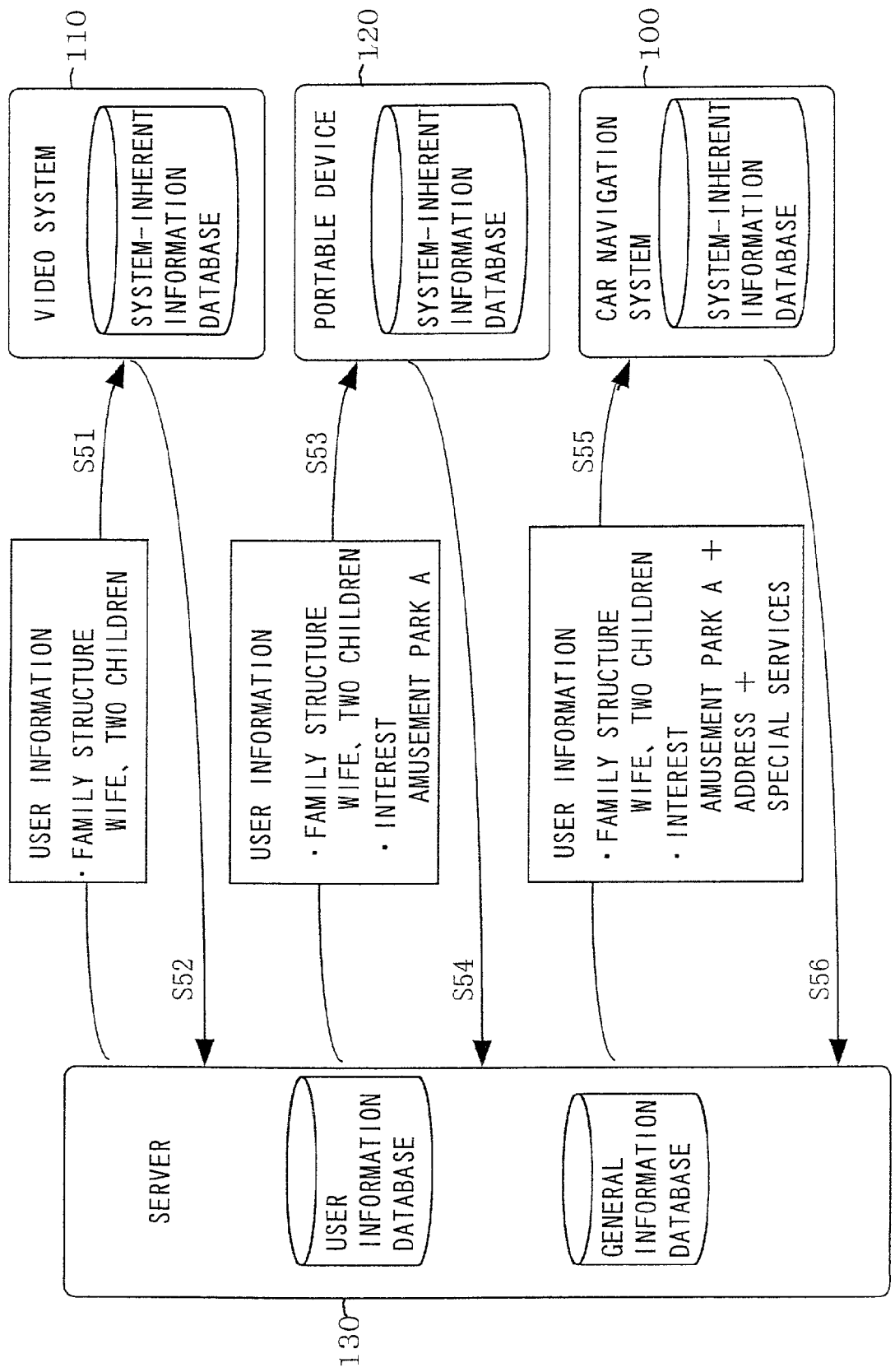

INFORMATION PROCESSING APPARATUS AND INFORMATION PROCESSING METHOD

BACKGROUND OF THE INVENTION

1. Field of the Invention

The present invention relates to an information processing apparatus that can select the best information from multiple information by utilizing information which can be applied in common among multiple systems.

2. Description of Related Art

When a human wishes to operate a system as he desires, he must use some physical means to in link his desire with the operation of the system. To operate a system using an input device such as a keyboard or a remote controller, a user must know well what to do with the input device to achieve his desire instantly. Otherwise, he has to take similar actions again and again.

When operating a system by voice, the user converts his desire into voice (words), and then the voice is inputted to a voice recognition device (engine). The voice recognition device, storing a preselected group of proposed voice(command) which is likely to be inputted, extracts therefrom several proposed voice compatible with the inputted voice, and provides the most positive one to the user. Then, the user determines whether the proposed voice provided by the voice recognition device is appropriate or not. If the proposed voice is appropriate, the user lets the system operate based on the proposed voice. If the proposed voice is not appropriate, the user stops the system using the input device such as the remote controller, or the voice recognition device, inputs the voice again, or selects another voice extracted by the voice recognition device until his desire is achieved.

However, to achieve his desire using such input devices, the user must understand the structure of the system as well as in what way the system operates, since the input devices are heavily dependent on the structure of the system.

Moreover, the input devices are designed solely to convert the user desire into the control of the system, but not designed to achieve what the user desires. The voice recognition device is designed to only reproduce what the user words to express his desire, but not designed to achieve what the user desires. These devices only follow what the user explicitly directs them to operate through his operational commands. Hence, if wishing to operate a sophisticated system or having to use these input devices which are less versatile, then the user is forced to take quite cumbersome actions in order to achieve his desire, i.e., select the best information from among multiple information and/or rank information, for example.

To operate the system with the keyboard or the remote controller as the input device, for example, the user usually needs to follow predetermined steps and also give several operational commands to the input device, which is troublesome. In addition, the user, often required to select means for achieving his desire from several steps prescribed by the system, needs to be well trained beforehand.

When operating the system using the voice recognition device, the voice recognition device, due to its processing the inputted voice based on the preselected group of proposed voice, often fails to correctly respond to the inputted voice when the user's desire is expressed in a different way from what is expected as the proposed voice, or fails to flexibly accommodate changes in operating environments that affect the user's desire as well as changes in how the user utilizes the system through his habit and/or experience.

SUMMARY OF THE INVENTION

It is therefore an object of the present invention to provide an information processing apparatus and an information processing method that can select and rank information while better reflecting the user's thinking, and hence with flexibility and higher reliability.

The above object of the present invention can be achieved by an information processing apparatus incorporated into an applied system, for utilizing three information groups divided by type into a general information which is independent of a user and the applied system, a system-inherent information which is independent of the user but dependent on the applied system, and a user information which is dependent on the user but independent of the applied system, provided with: an input device for inputting a plurality of information; and a selecting device for selecting one or more best information from the inputted plurality of information based on the information groups.

The term "an applied system" herein means any system that can incorporate the information processing apparatus of the present invention and operate while maintaining features of the information processing apparatus, such as a car navigation system, a video system, and any of portable devices including cellular telephone(including PHS-based ones) and personal digital assistant(PDA).

According to the present invention, three information groups divided by type into the general information, the system-inherent information, and user information, are utilized to give operational directions to the information processing apparatus, and the information processing apparatus selects one or more best information from a plurality of input information based on the three information groups, whereby the best information can be selected with flexibility and higher reliability. Hence, a user can eliminate trouble involved in operating the applied system.

In one aspect of the information processing apparatus of the present invention, the selecting device narrows the plurality of input information down to the one or more best information based on an order in which the information groups are utilized.

According to this aspect, the best information is narrowed down from a plurality of information based on an order in which the three information groups is utilized, whereby the best information can be selected with flexibility and higher reliability.

In another aspect of the information processing apparatus of the present invention, the selecting device includes: a first device for narrowing the plurality of information down to one or more specific information based on the general information; a second device for further narrowing the one or more specific information narrowed by the first device down to one or more specific information based on the system-inherent information; and a third device for still further narrowing the one or more specific information narrowed by the second device down to the one or more best information based on the user information.

According to this aspect, the best information is narrowed down from a plurality of information based on the order of the general information, the system-inherent information, and the user information, a more efficient selection of the best information can be implemented.

In further aspect of the information processing apparatus of the present invention, the selecting device outputs a command signal to operate the applied system according to the selected one or more best information.

According to this aspect, the applied system can operate according to the best information selected by the selecting device, whereby the user can operate the applied system in an extremely user-friendly way.

In further aspect of the information processing apparatus of the present invention, the applied system comprises a voice recognition device, and the selecting device selects one or more best information from a plurality of information provided by the voice recognition device.

According to this aspect, the voice recognition device (e.g., a voice recognition engine) recognizes the plurality of proposed voice from a voice spoken by a user, and selects the best information from the plurality of proposed voice based on the three information groups, whereby the voice recognition device can be supported effectively.

The above object of the present invention can be achieved by an information processing apparatus incorporated into an applied system, for utilizing three information groups divided by type into a general information which is independent of a user and the applied system, a system-inherent information which is independent of the user but dependent on the applied system, and a user information which is dependent on the user but independent of the applied system, provided with: an input device for inputting a plurality of information; and a ranking device for ranking the inputted plurality of information in a most appropriate order based on the information groups.

According to the present invention, three information groups divided by type into the general information, the system-inherent information, and user information, and the information processing apparatus ranks a plurality of input information in the most appropriate order based on the three information groups, whereby the plurality of input information can appropriately be ranked with higher reliability. Hence, a user can eliminate trouble involved in operating the applied system.

The above object of the present invention can be achieved by an information processing apparatus incorporated into an applied system, for utilizing three information groups divided by type into a general information which is independent of a user and the applied system, a system-inherent information which is independent of the user but dependent on the applied system, and a user information which is dependent on the user but independent of the applied system, provide with: an input device for inputting an abstract information; and an adding device for adding a concrete information to the inputted abstract information based on the information groups.

According to the present invention, three information groups divided by type into the general information, the system-inherent information, and user information, and the information processing apparatus adds the concrete information to the inputted abstract information based on the three information groups, whereby information can be provided, which better responds to the user's needs. Hence, a user can eliminate trouble involved in operating an applied system.

In one aspect of the information processing apparatus of the present invention, the apparatus comprises a updating device for updating the user information based on operation conditions of the user of the applied system.

According to this aspect, the more a user utilizes the applied system incorporating the information processing apparatus, the more the user information reflects the user's thinking to grow increasingly valuable to the user's advantage. By utilizing the thus grown user information, the user can operate the applied system with gradually improved user-friendliness, flexibility, operability, etc. with which the user could not have operated the applied system at the initial stage of operation.

In another aspect of the information processing apparatus of the present invention, the user information can be commonly utilized by apparatuses incorporated into applied systems of different type.

According to this aspect, the user information of a particular user, which reflects his thinking while applied to one system, can directly be applied to other systems. Thus, by utilizing such user information in operating various types of applied systems, the user information can be tailored increasingly to the user's thinking according to the features of the applied systems.

In further aspect of the information processing apparatus of the present invention, the apparatus comprises a updating device for updating the system-inherent information based on changes in environments involving the applied system.

According to this aspect, the system-inherent information can be automatically updated according to changes in environments involving the applied system (including how the user operates the applied system), whereby the system-inherent information can become more valuable.

In further aspect of the information processing apparatus of the present invention, the system-inherent information can be commonly utilized by apparatuses incorporated into applied systems of same type, used respectively by users.

According to this aspect, the system-inherent information is commonly utilized among many users, whereby the system-inherent information can become even more valuable.

In further aspect of the information processing apparatus of the present invention, the information groups are stored, in part or in whole, in a database managed by a server built on a network commonly accessible by apparatuses incorporated into applied systems, and the apparatus acquires and utilizes required one or ones of the information groups from the database via the network.

According to this aspect, for example, the general information and the user information can be utilized in common among a plurality of applied systems on a network, whereby the applied systems can be become more user-friendly.

The above object of the present invention can be achieved by an information processing method for utilizing three information groups divided by type into a general information which is independent of a user and the applied system, a system-inherent information which is independent of the user but dependent on the applied system, and a user information which is dependent on the user but independent of the applied system, provided with: an input process of inputting a plurality of information; and a selecting process of selecting one or more best information from the inputted plurality of information based on the information groups.

According to the present invention, three information groups divided by type into the general information, the system-inherent information, and user information, are utilized to give operational directions to the information processing apparatus, and the information processing apparatus selects one or more best information from a plurality of input information based on the three information groups, whereby the best information can be selected with flexibility and higher reliability. Hence, a user can eliminate trouble involved in operating the applied system.

In one aspect of the information processing method of the present invention, the selecting process narrows the plurality of input information down to the one or more best information based on an order in which the information groups are utilized.

According to this aspect, the best information is narrowed down from a plurality of information based on an order in which the three information groups is utilized, whereby the best information can be selected with flexibility and higher reliability.

In another aspect of the information processing method of the present invention, the selecting process includes a first process of narrowing the plurality of information down to one or more specific information based on the general information; a second process of further narrowing the one or more specific information narrowed by the first process down to one or more specific information based on the system-inherent information; and a third process of still further narrowing the one or more specific information narrowed by the second process down to the one or more best information based on the user information.

According to this aspect, the best information is narrowed down from a plurality of information based on the order of the general information, the system-inherent information, and the user information, a more efficient selection of the best information can be implemented.

The above object of the present invention can be achieved by an information processing method for utilizing three information groups divided by type into a general information which is independent of a user and the applied system, a system-inherent information which is independent of the user but dependent on the applied system, and a user information which is dependent on the user but independent of the applied system, provide with: an input process of inputting a plurality of information; and a ranking process of ranking the inputed plurality of information in a most appropriate order based on the information groups.

According to the present invention, three information groups divided by type into the general information, the system-inherent information, and user information, and the information processing apparatus ranks a plurality of input information in the most appropriate order based on the three information groups, whereby the plurality of input information can appropriately be ranked with higher reliability. Hence, a user can eliminate trouble involved in operating the applied system.

The above object of the present invention can be achieved by An information processing method for utilizing three information groups divided by type into a general information which is independent of a user and the applied system, a system-inherent information which is independent of the user but dependent on the applied system, and a user information which is dependent on the user but independent of the applied system, provide with: an input process of inputting an abstract information; and an adding process of adding a concrete information to the inputted abstract information based on the information groups.

According to the present invention, three information groups divided by type into the general information, the system-inherent information, and user information, and the information processing apparatus adds the concrete information to the inputted abstract information based on the three information groups, whereby information can be provided, which better responds to the user's needs. Hence, a user can eliminate trouble involved in operating an applied system.

BRIEF DESCRIPTION OF THE DRAWINGS

FIG. 13 shows how information groups are used in the configuration of FIG. 12.

DETAILED DESCRIPTION OF THE PREFERRED EMBODIMENTS

Figure 1:
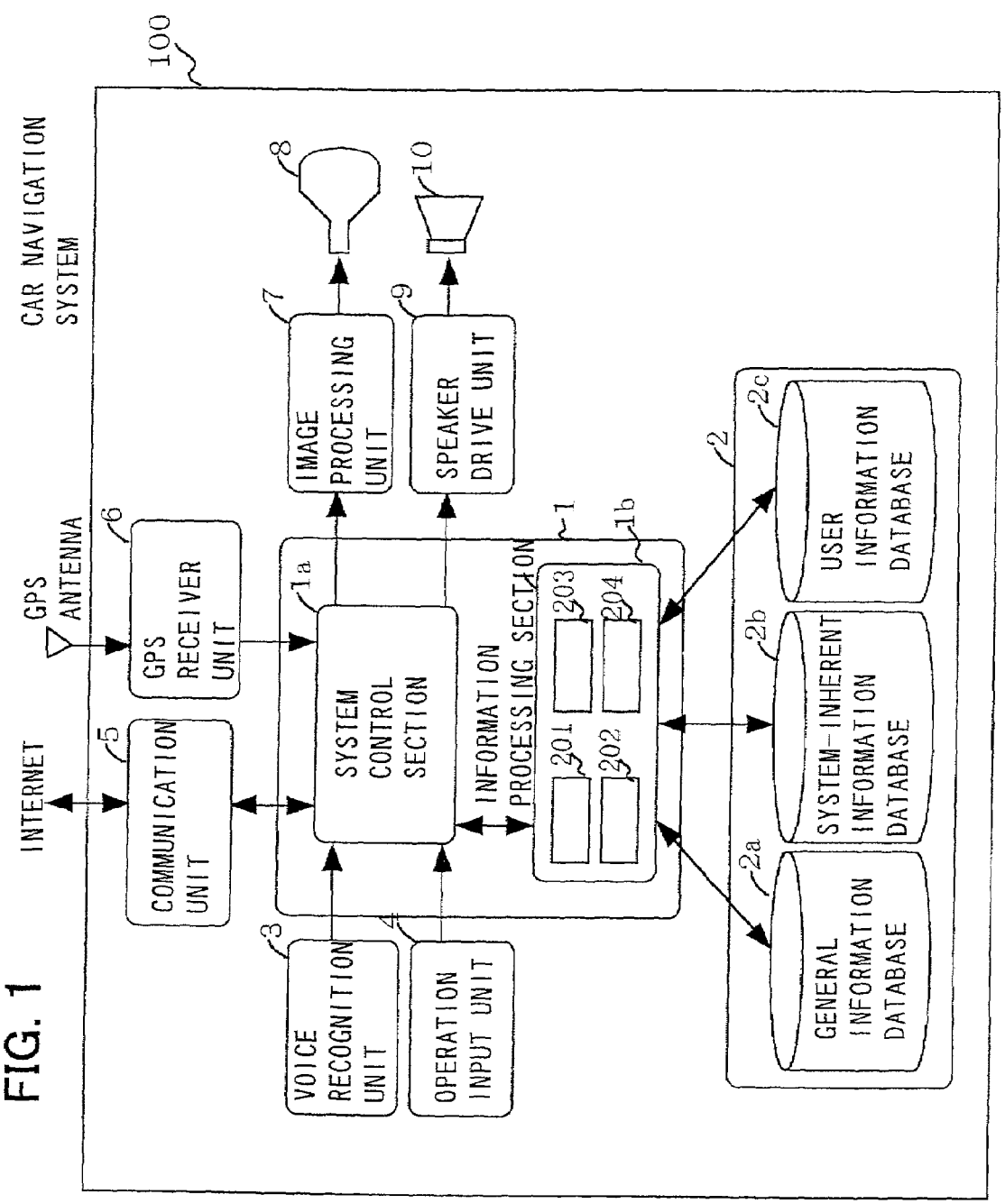
FIG. 1 shows an exemplary overview configuration in which an information processing apparatus according to the present invention is applied to a car navigation system as an applied system.

Referring now to FIG. 1, the car navigation system 100 as an applied system comprises a system control unit 1 including a CPU, a RAM (work RAM) and a ROM, a storage unit 2 for storing various information, a voice recognition unit 3 as an input device having a function as a voice recognition engine that recognizes voice spoken by a user, an operation input unit 4 as an input device for allowing the user to enter the operational commands, a communication unit 5 including a modem for connection to networks such as mobile communication networks and the Internet, a GPS (Global Positioning System) receiver unit 6 that receives radio waves from GPS satellites via a GPS antenna, an image processing unit 7 that generates and processes images from map data and other data such as a vehicle's traveling direction in accordance with instruction from the system control unit 1 to display the images on a display 8, and a speaker drive unit 9 that reproduces voice data including destinations and routing guidance information from a speaker 10 for the user in accordance with instruction from the system control unit 1.

The system control unit 1 includes a system control section 1a, and an information processing section (unit) 1b as the information processing apparatus, and also performs a time measurement function. The system control section 1a supervises control over the whole operations of the car navigation system 100 in cooperation with the information processing section 1b, for information input control from the voice recognition unit 3 as an input device, operation input unit 4 and GPS receiver unit 6, data output control to the image processing unit 7 and speaker drive unit 9, and data communication control with other systems and devices via the communication unit 5 and the networks, for example. The system control section 1a also performs a position detection function based on GPS position measurement systems for detecting the current location from information received by the GPS receiver unit 6.

The information processing section 1b, having functions as a selecting device 201, a ranking device 202, an adding device 203, and a updating device 204, performs a process of selecting the best one or ones of a plurality of proposed information and a process of adding the best concrete information to abstract information by utilizing information stored in various databases incorporated in the storage unit 2, so that the system 100 can offer suitable information to its user or users. The information processing section 1b also performs a process of updating system-inherent information and user information in accordance with operational commands from a user and/or changes in environments.

As shown in FIG. 1, the storage unit 2 includes logically constructed databases 2a, 2b, and 2c, each storing a different type of information. A general information database 2a stores "general information." A system-inherent information database 2b stores "system-inherent information." A user information database 2c stores "user information."

Figure 2:
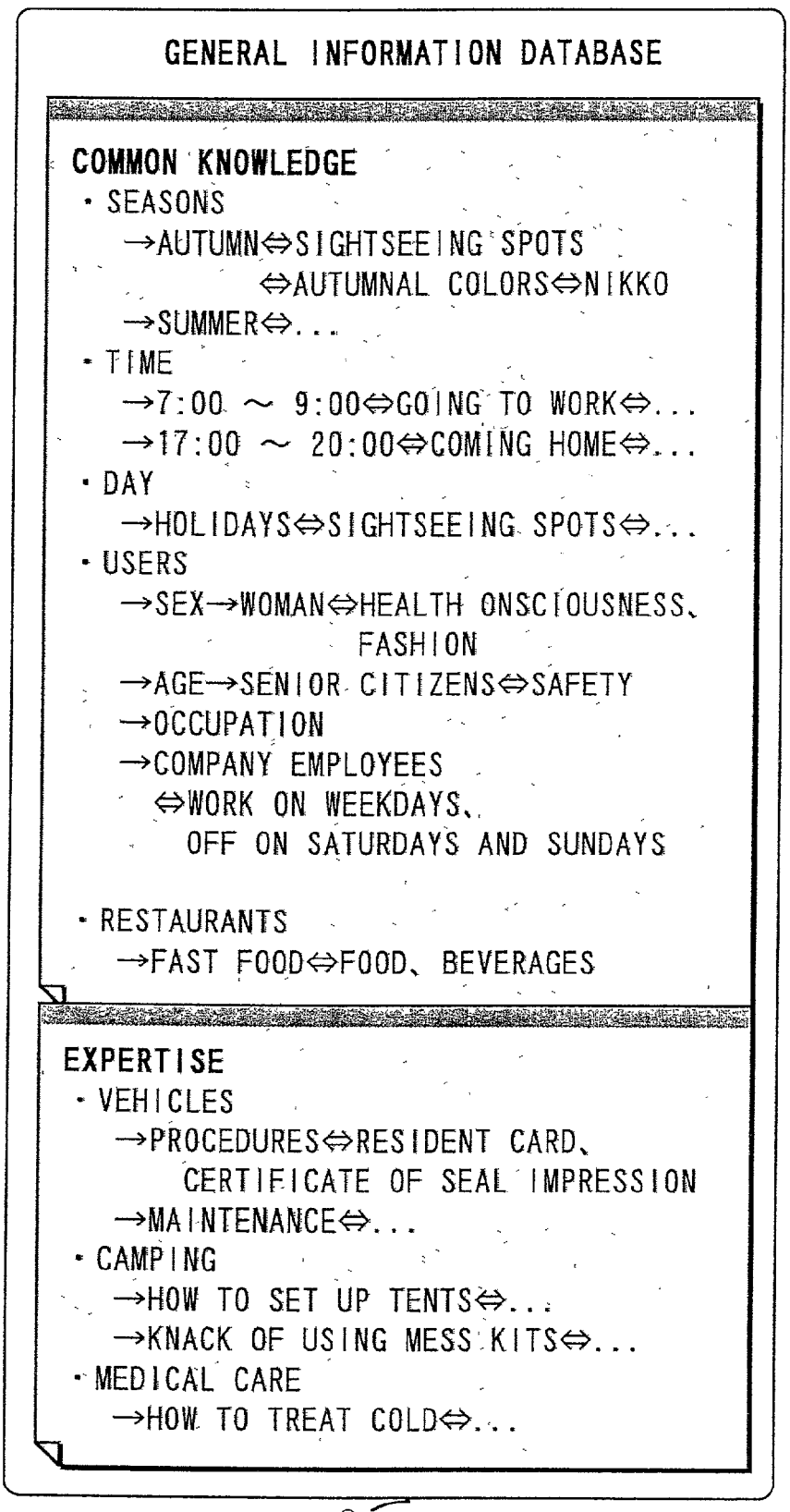
FIG. 2 shows exemplary information stored in a general information database incorporated in a storage unit 2.
Figure 3:
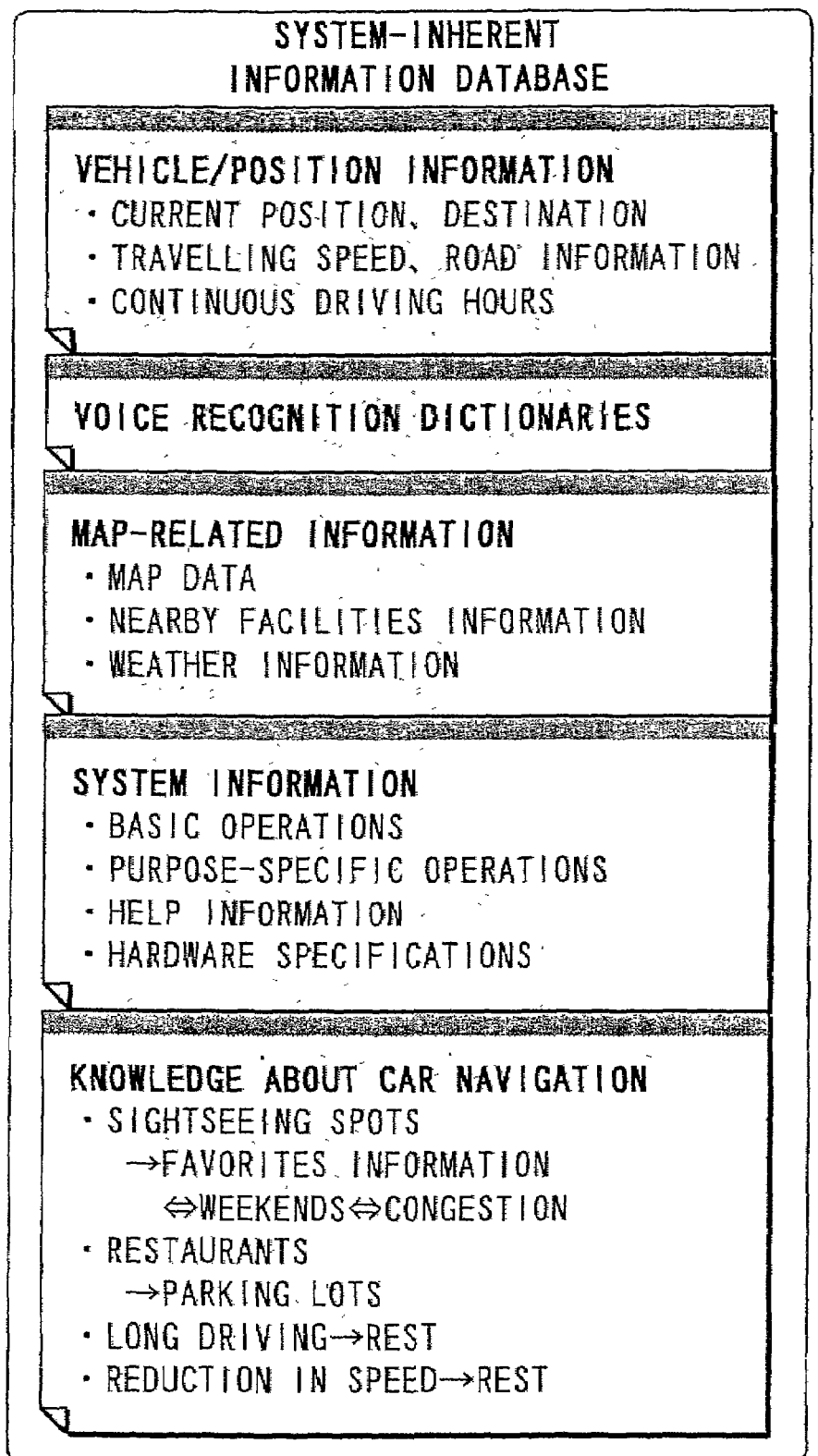
FIG. 3 shows exemplary information stored in system-inherent information database incorporated in a storage unit 2.
Figure 4:
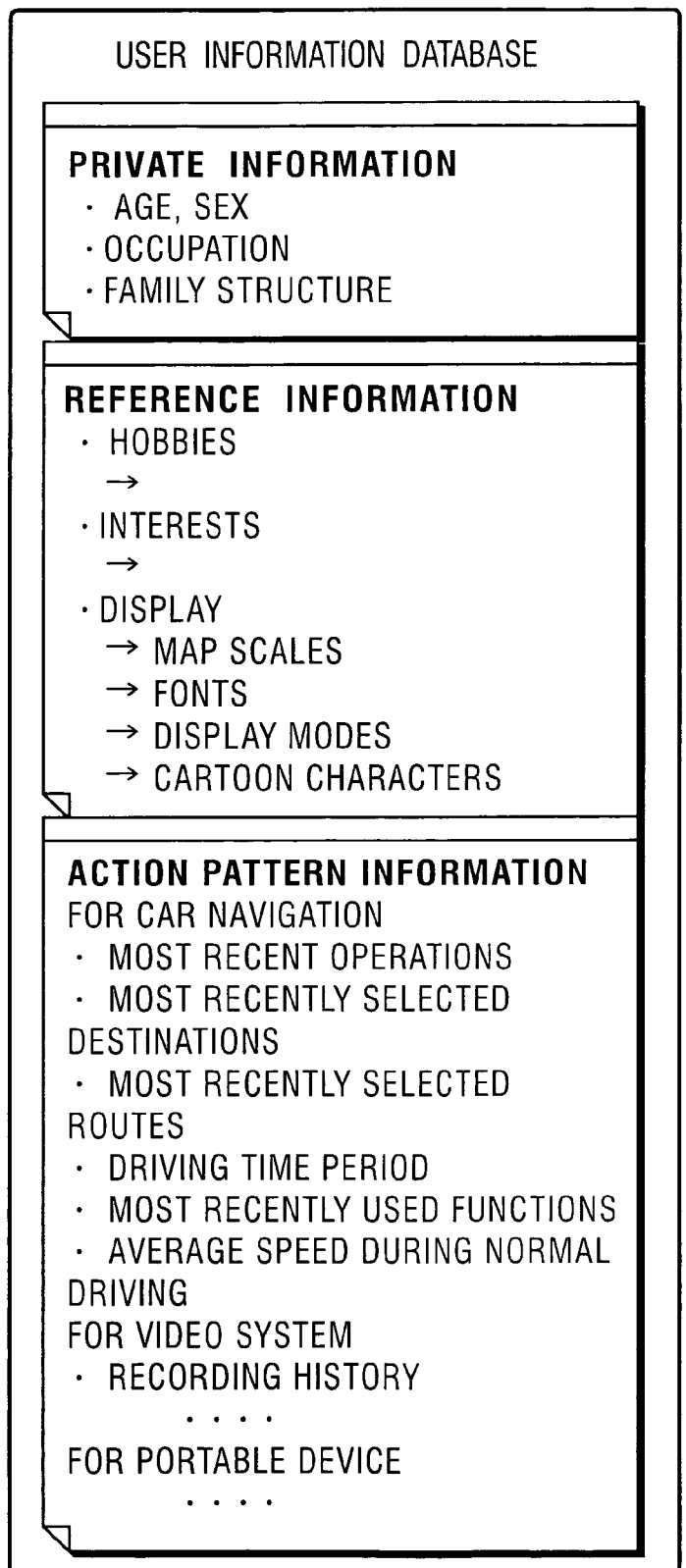
FIG. 4 shows exemplary information stored in user information database incorporated in a storage unit 2.

FIGS. 2 to 4 show exemplary information stored in these databases incorporated in the storage unit 2. The general information stored in the general information database 2a includes information which is universal, such as common knowledge and expertise, and which is common to all users and applied systems, i.e., independent of users and applied systems. In this database 2a, such general information is structured so that the structured information can be stored in linkage with one another. For example, an item "sightseeing spots in autumn" is linked to spots where users can enjoy "autumnal colors," which are then linked to "Nikko." Moreover, a time period "17:00–20:00" is linked to actions such as "coming home" and "going for a drink," for example.

The system-inherent information stored in the system-inherent information database 2b is common to all users, but is unique to the car navigation system, i.e., information independent of users but dependent on an applied system. Such system-inherent information includes vehicle/position information, voice recognition dictionaries, map-related information, system information, and knowledge about car navigation.

The user information stored in the user information database 2c includes private information such as the user's age, sex, occupation, family structure, user's preference information, and user's action pattern information. Such user information is common to all applied systems, but is unique to each user, i.e., independent of applied systems but dependent on a particular user.

The information groups, which are divided into three groups by type, namely, the general information, the system-inherent information, and the user information as described above, give the information processing section 1b directions as to how the section 1b should operate to tailor the applied systems to various user needs.

Figure 5:
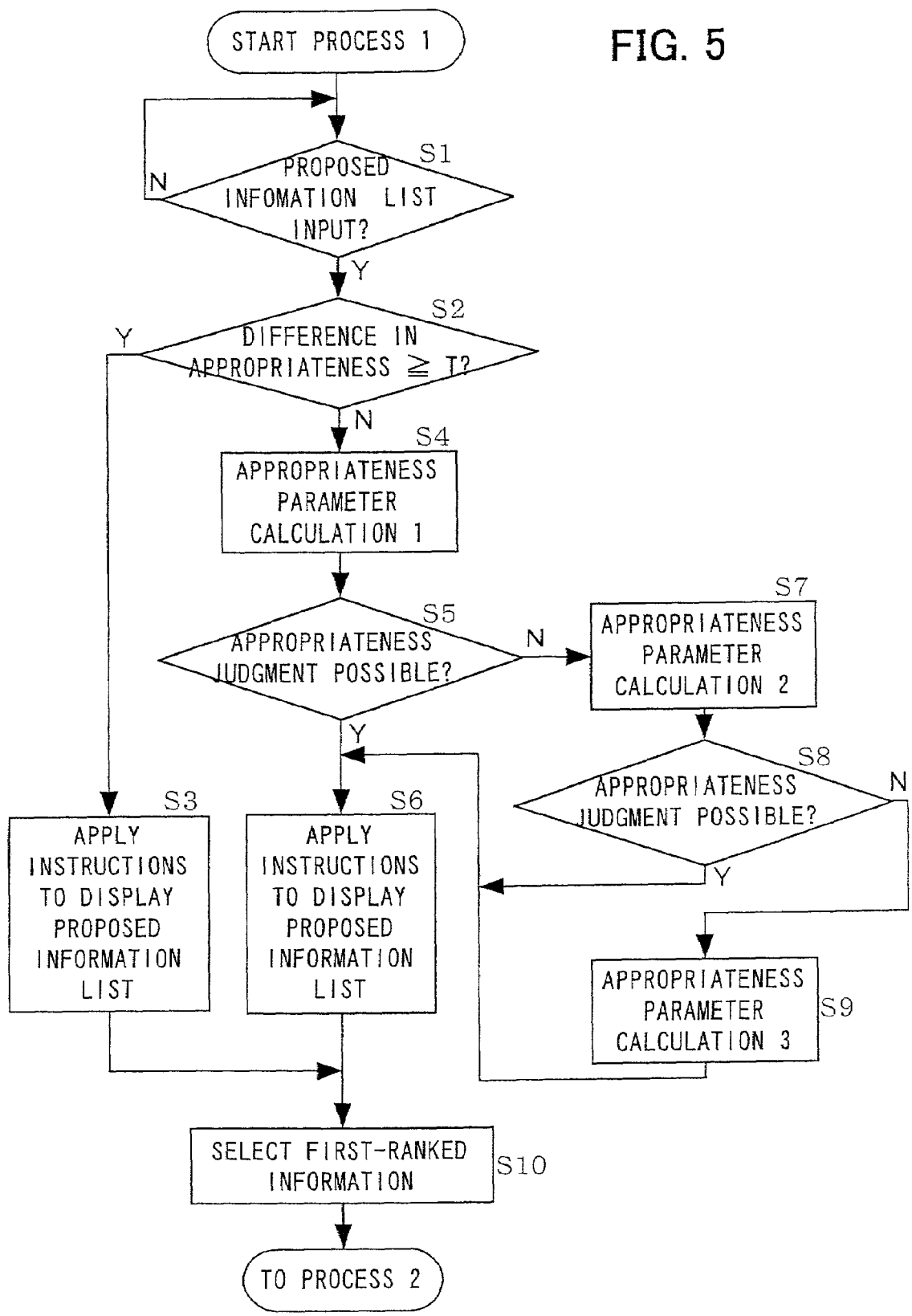
FIG. 5 is a flowchart showing an exemplary case where a process 1 is applied to the car navigation system 100.

FIG. 5 is a flowchart showing an exemplary case where a process 1 performed by the information processing section 1b is applied to the car navigation system 100. In the process 1, the section 1b selects the best one of proposed information by utilizing the general information, system-inherent information, and user information.

First, a user driving home from his company speaks a word (voice) "Home" as a destination in a vehicle equipped with the car navigation system 100. In response to the voice "Home," the voice recognition unit 3 recognizes the frequencies, waveforms, etc. of such voice, selects some compatible information from among proposed information prepared in advance, ranks the selected proposed information in the order of the best compatibility, and makes a list in which each proposed information is given a value of appropriateness commensurate with its compatibility. For example, "Cemetery X" (rank 1, 80 points), "Home" (rank 2, 75 points), and "Bar Y" (rank 3, 70 points) are proposed to the user as a proposed information list with an initial ranking. Such a proposed information list is inputted to the information processing section 1b via the system control section 1a. Upon input of this proposed information list (step S1), first, the information processing section 1b determines whether or not the difference in value of appropriateness between the first-ranked proposed information and each of the second- and third-ranked proposed information is equal to or greater than a predetermined value T (e.g., 30 points) (step S2). If the answer is "Y" (yes), the section 1b, judging that the initial ranking in the proposed information list would be appropriate enough, applies to the system control section 1a command signals (instructions) for displaying the proposed information list with the initial ranking along with a voice guidance message (step S3). As a result, the initial ranking in the proposed information list is displayed on the display 8, and the voice guidance message is reproduced to the effect that the proposed information ranked first in the proposed information list has been selected. The information processing section 1b selects the first-ranked information in the proposed information list (step S10), and then proceeds to a process 2.

On the other hand, if the difference is smaller than the predetermined value T in step S2, the information processing section 1b, doubting that the initial ranking in the proposed information list may not be appropriate, proceeds to step S4.

In an appropriateness parameter calculation 1 of step S4, the information processing section 1b acquires the general information from the general information database 2a to perform calculations as to the appropriateness of the initial ranking in the proposed information list, based on the acquired general information, and determines whether or not an appropriateness judgment can be made based on the result of the appropriateness parameter calculation 1 (step S5).

For example, if the current time is 19:00 on a weekday (the current time is acquired from the system control section 1a), the information processing section 1b determines that the information "Home" and "Bar Y" are more appropriate than "Cemetery X", judging from common knowledge included in the general information (e.g., the current time "19:00" is linked to actions such as "coming home" and "going for a drink," but not linked to an action such as "visiting a cemetery"). If the information processing section 1b cannot judge which is more appropriate, "Home" or "Bar Y," then the section 1b, determining that no appropriateness judgment can be made, proceeds to step S7. On the other hand, if, for example, "Bar Y" is not included in the proposed information list at all, the information processing section 1b can surmise that "Home" is more appropriate than "Cemetery X," and hence, determining that an appropriateness judgment can be made, proceeds to step S6. In step S6, the section 1b optimizes the initial ranking in the proposed information list by, for example, switching "Home" and "Cemetery X," and applies to the system control section 1*a* command signals for displaying the proposed information list with the optimized ranking along with the voice guidance message. The information processing section 1*b* then selects the first-ranked information ("Home") in the proposed information list (step S10), and proceeds to the process 2.

In an appropriateness parameter calculation 2 of step S7, the information processing section 1*b* additionally acquires the system-inherent information from the system-inherent information database 2*b* to perform calculations as to the appropriateness of the initial ranking in the proposed information list, based on both the general information and system-inherent information (or the calculations may be performed based only on the system-inherent information), and then determines whether or not an appropriateness judgment can be made based on the result of the appropriateness parameter calculation 2 (step S8).

For example, if it is found out that the distance to "Home" is 3 km and that the distance to "Bar Y" is 35 km from the map-related information included in the system-inherent information, then the information processing section 1*b*, capable of judging that "Home" may be more appropriate than "Bar Y" (e.g., a distance difference of 15 km is set as a reference for judgment), determines that an appropriateness judgment can be made. Thus, the section 1*b* proceeds to step S6 to optimize the initial ranking in the proposed information list. For example, the section 1*b* ranks "Home" first, "Bar Y" second, and "Cemetery X" third, and applies command signals to the system control section 1*a* for displaying the proposed information list with the optimized ranking along with the voice guidance message. Then, the information processing section 1*b* selects the information ranked first in the optimized proposed information list (step S10), and proceeds to the process 2. On the other hand, if it is found out, for example, that the distance to "Home" is 3 km and that the distance to "Bar Y" is 5 km from the map-related information included in the system-inherent information and thus the section 1*b* still fails to judge which is more appropriate, "Home" or "Bar Y," then the section 1*b*, determining that no appropriateness judgment can be made, proceeds to step S9.

In an appropriateness parameter calculation 3 of step S9, the information processing section 1*b* additionally acquires the user information from the user information database 2*c* to perform calculations as to the appropriateness of the initial ranking in the proposed information list, based on the general information, system-inherent information, and user information (or the calculations may be performed based only on the user information).

For example, if it is found out from the private information and preference information included in his user information that the user has a wife and children and does not drink, or from his action pattern information that he usually comes home during this time period, then the information processing section 1*b*, judging that "Home" is more appropriate than "Bar Y," proceeds to step S6 to optimize the initial ranking in the proposed information list. For example, the section 1*b* ranks "Home" first, "Bar Y" second, and "Cemetery X" third, and applies command signals to the system control section 1*a* for displaying the proposed information list with the optimized ranking along with the voice guidance message. Then, the information processing section 1*b* selects the information ranked first in the optimized proposed information list (step S10), and proceeds to the process 2. On the other hand, if it is found out, for example, that the user is a bachelor and also likes drinking from the private information and preference information included in his user information, or that he usually goes for a drink during this time period from his action pattern information, then the information processing section 1*b*, judging that "Bar Y" is more appropriate than "Home," proceeds to step S6 to optimize the initial ranking in the proposed information list. For example, the section 1*b* ranks "Bar Y" first, "Home" second, and "Cemetery X" third, and applies command signals to the system control section 1*a* for displaying the proposed information list with the optimized ranking along with the voice guidance message. Then, the information processing section 1*b* selects the information ranked first in the proposed information list (step S10), and proceeds to the process 2.

In one embodiment, if the information processing section 1*b* still fails to make an appropriateness judgment even using such user information as above, then the section 1*b* may reference the general information again to judge that "Home" is more appropriate based on the common knowledge that users of car navigation systems often speak "Home." In addition, if a passenger counter is mounted, the number of passengers counted may be stored as a system-inherent information for judgment of appropriateness.

In this way, in the process 1 shown in FIG. 5, the information processing section 1*b* narrows the proposed information selected by the voice recognition unit 3 down to more appropriate proposed information in the order of the general, system-inherent, and user information, so that the best proposed information can finally be selected. Thus, the user's thinking is better reflected in the selection process to select the best proposed information with flexibility and more reliability. Such selection of the best proposed information from multiple proposed information based on the three information groups effectively complements the voice recognition unit 3 to back up the user.

In some embodiments, the best proposed information may be selected by narrowing the information proposed by the unit 3 in various orders other than the above referred to in the case of FIG. 5 (e.g., in the order of the user information, system-inherent information, and general information) or in various combinations, depending on the specific situation. Moreover, one or more best proposed information may be selected in the process 1.

Next, the flowchart shown in FIG. 4 refers in part to an exemplary case where the process 2 performed by the information processing section 1*b* is applied to the car navigation system 100. In the process 2, the section 1 adds the best concrete information to abstract information.

This process 2 starts either directly from the process 1 or with an input step S11 in which the section 1*b* checks if the user "manually" inputs a command to the system 100 via the operation input unit 4. Then, in step S12, the information processing section 1*b* performs calculations for a compatibility check with the current state of operation based on the system-inherent information to determine whether or not the current state of operation is compatible with subsequent steps to be followed, from the results of the calculations (step S13). If the process 2 is started directly from the process 1 of FIG. 5, the information processing section 1*b*, standing by to activate route searching, automatically determines that the current state of operation is compatible. On the other hand, if the user inputs a destination ("Home") through the operation input unit 4 to "manually" start the process 2, independently of the process 1 shown in FIG. 5, then the information processing section 1*b* judges whether or not the user's action is compatible with the current state of the system 100 or with an operation menu on the display 8. If the user's action is incompatible (e.g., one of the ten keys is pressed on a screen that accepts only an input from the "Up" and "Down" keys), then the section 1*b*, determining that the action is incompatible, prepares a graphical user interface (GUI) by combining information about how the user should act, with favorites information, etc. which the user can acquire if the user acts as he should, and further arranging the combined information in order, and then displays the prepared GUI on the display 8 (step S14).

If it is determined that the state of operation is compatible in step S13, the information processing section 1*b* selects a route from "Company" to "Home" based on the system-inherent information and user information (step S15). For example, the section 1*b* selects various routes including routes through national roads, highways and bypasses based on the vehicle/position information, map-related information, etc. included in the system-inherent information, and then selects the route most frequently used on weekdays during this time period from the above-selected routes based on the user's action pattern information included in the user information.

Next, the information processing section 1*b* selects information about facilities on the selected route based on the system-inherent and user information (step S16). For example, the section 1*b* selects information about various facilities lining the route, such as convenience stores, supermarkets, and rental shops, based on the map-related information included in the system-inherent information, and then selects one or more facilities most frequently dropped by during this time period on weekdays based on the action pattern information included in the user information.

Next, the information processing section 1*b* calculates the time required to reach "Home" from "Company" based on both some relevant user information and the selected route (step S17) For example, the required time is calculated based on both the average traveling speed during this time period, which is found in the action pattern information as the user information, and on the distance obtained from the selected route.

Then, the information processing section 1*b* arranges the thus selected and calculated information in preparation for indication on the display 8 (step S18), after which the section 1*b* applies command signals to the system control section 1*a* for displaying the arranged information along with a voice guidance message (step S19). As a result, the selected route from "Company" to "Home" and facilities information, as well as the calculated required time, etc. are indicated on a map displayed on the display 8, along with the voice guidance message reproduced from the speaker 10.

Figure 6:
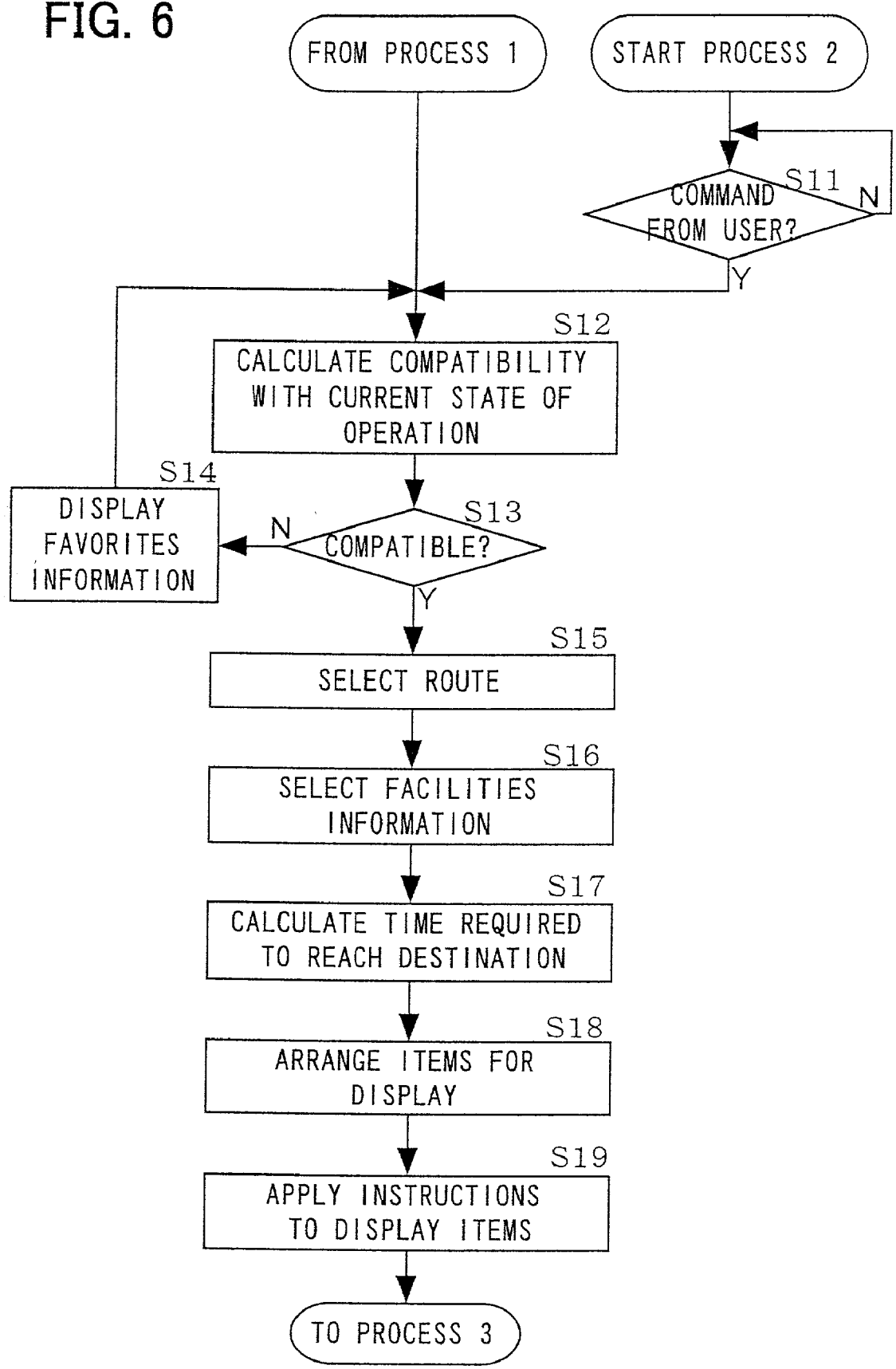
FIG. 6 is a flowchart showing an exemplary case where a process 2 is applied to the car navigation system 100.

In this way, the process 2 of FIG. 6 adds concrete information, such as routes, facilities information, and the required time to reach a destination, to abstract information, such as a selected information "Home," based on the system-inherent information and user information. Thus, according to the process 2, information can be provided, which better reflects the user's thinking and is hence more useful to the user. In addition, the user can operate the car navigation system 100 in accordance with the best information proposed by the process 1, whereby the user can operate the car navigation system 100 in an extremely user-friendly way.

Figure 7:
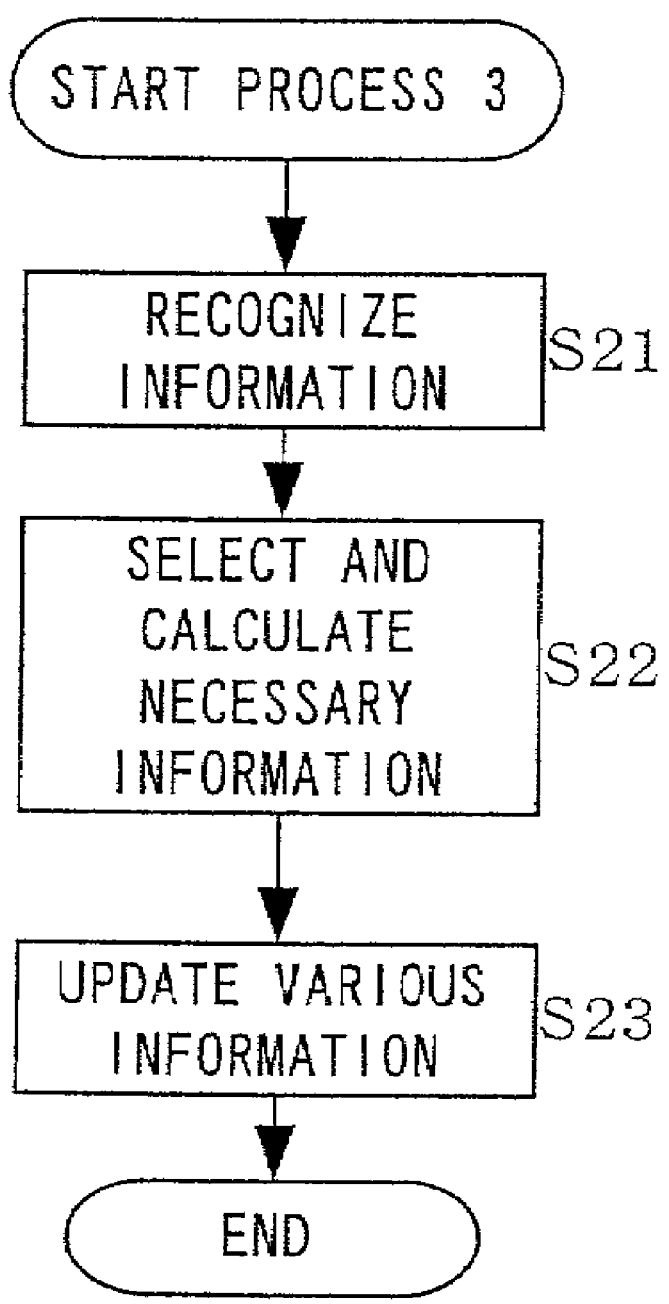
FIG. 7 is a flowchart showing an exemplary case where a process 3 is applied to the car navigation system 100.

Next, the flowchart shown in FIG. 7 refers in the rest to an exemplary case where a process 3 performed by the information processing section 1*b* is applied to the car navigation system 100. In the process 3, the section 1*b* updates the system-inherent information and user information in accordance with operational commands from the user and/or changes in environments.

On the way "Home" from "Company," the information processing section 1*b* recognizes various information depending on operational commands from the user and/or changes in environments (step S21). For example, the section 1*b* recognizes, when the vehicle stops at a place for a predetermined time, facilities on that place based on the map-related information included in the system-inherent information, or congestion based on the traveling speed. Thus, upon arrival at the destination "Home," the section 1*b* selects and calculates necessary information from the recognized information (step S22) to update the relevant system-inherent and user information (step S23). For example, the congestion along the route in question is added to update the system-inherent information, or upon stoppage of the vehicle at a convenience store for a predetermined time, the most recent visits to convenience stores are overwritten to update the user information. In addition, upon reaching "Home," the section 1*b* calculates an average traveling speed for driving from "Company" to "Home" to update the last average traveling speed available, in consideration of both the currently calculated average traveling speed and the average traveling speed during the time period in question stored as an action pattern information included in the user information.

In this way, according to the process 3, new information is added or overwritten to update the system-inherent information and/or the user information in accordance with operational commands from the user as well as changes in environments. Thus, the more frequently the information is updated, the better the information reflects the user's thinking during next rounds of the processes 1 and 2 to select and provide even better information during such next rounds of the processes 1 and 2. Hence, the user can eliminate trouble involved in operating an applied system, such as the car navigation system 100.

Some relationships among the general, system-inherent, and user information which are usable as described above, users, and applied systems are shown schematically in FIGS. 5 to 7. It should be noted that the applied systems may include various systems, systems, apparatuses, and devices in addition to the car navigation system, a video system, and a portable device which are herein listed.

Figure 8:
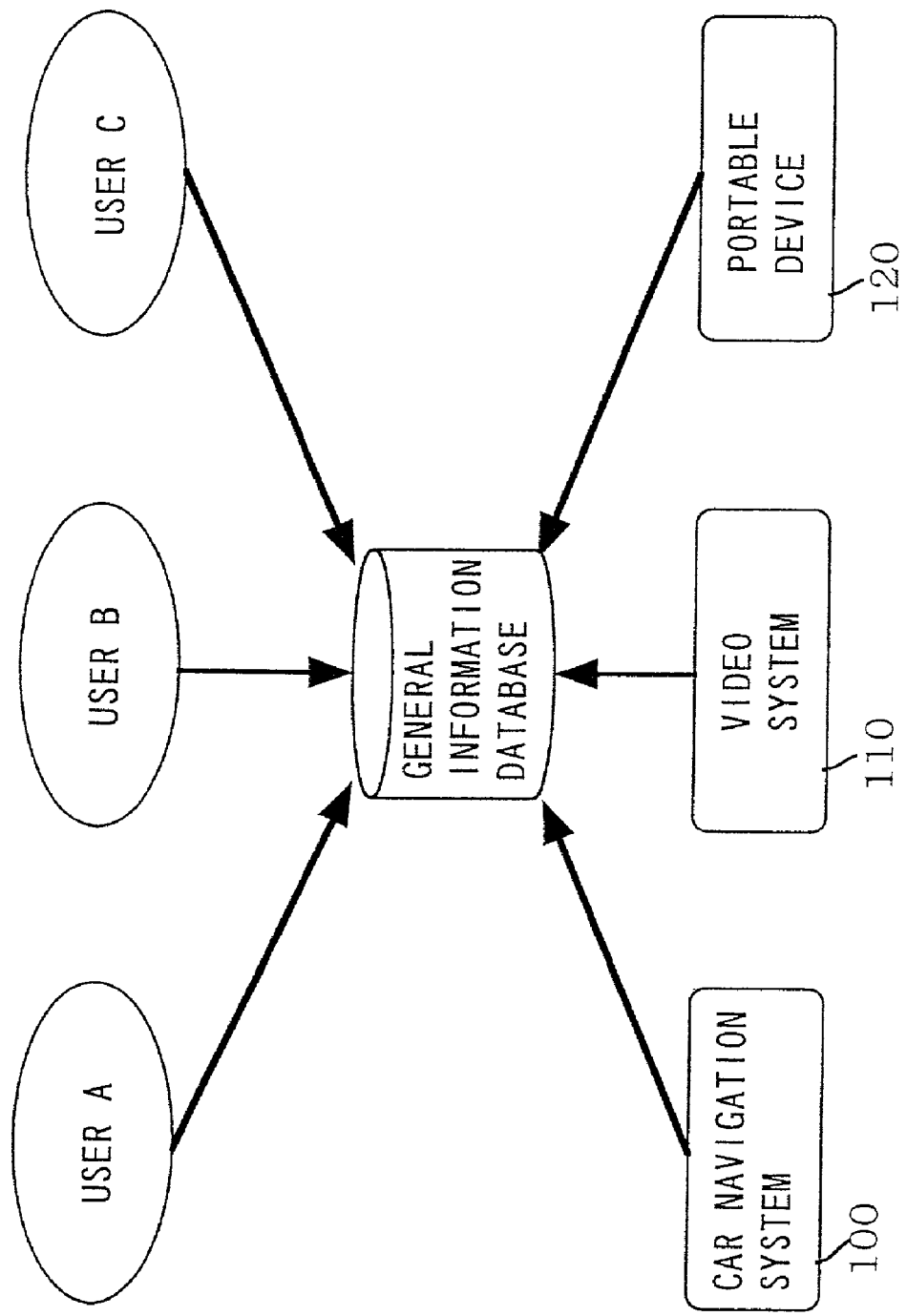
FIG. 8 schematically shows a relationship among the general information, users, and applied systems.

As shown in FIG. 8, general information stored in a general information database can be utilized in common among users A, B, and C, as well as among the car navigation system 100, a video system 110, and a portable device 120.

Figure 9:
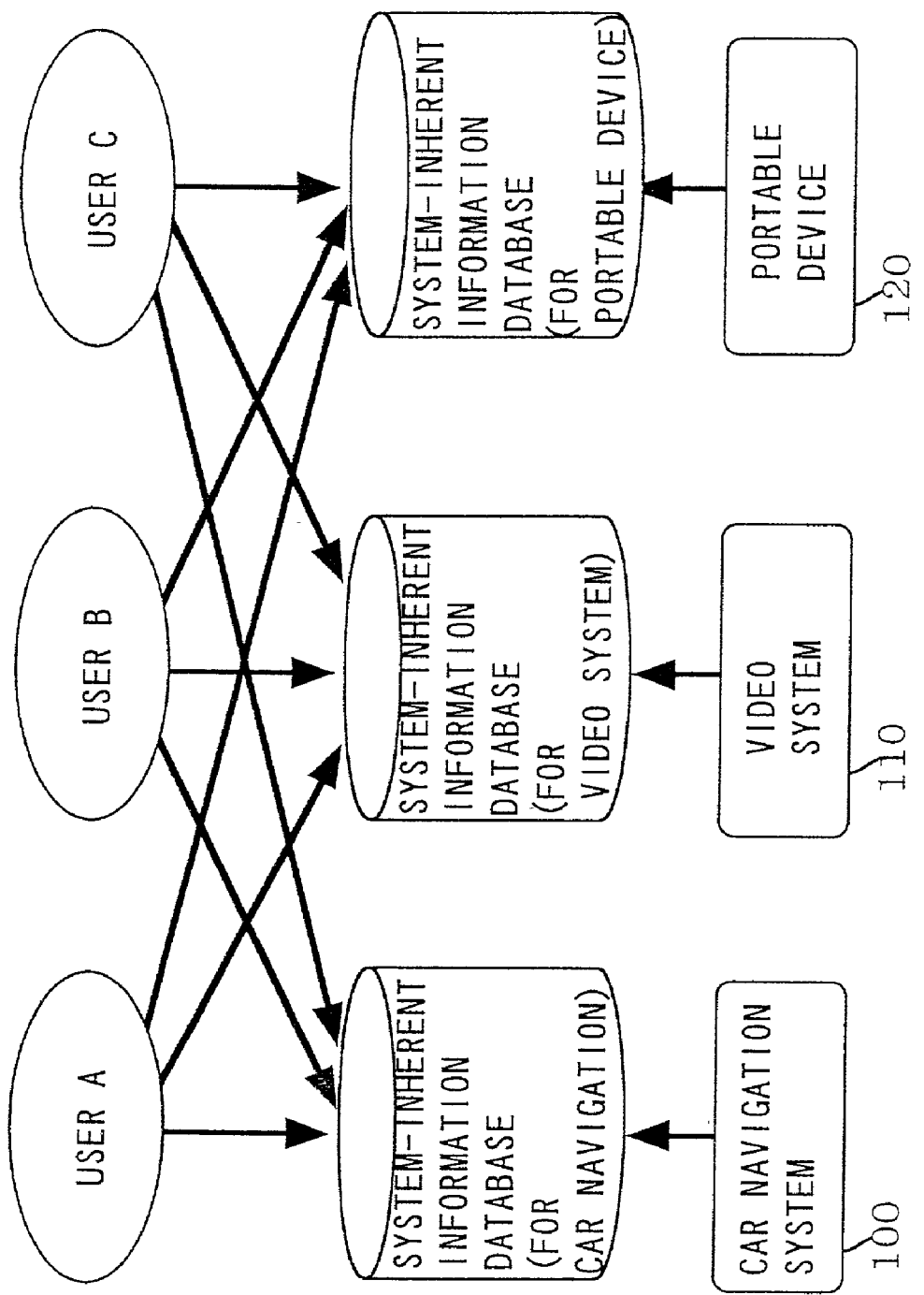
FIG. 9 schematically shows a relationship among the system-inherent information, the users, and the applied systems.
Figure 11:
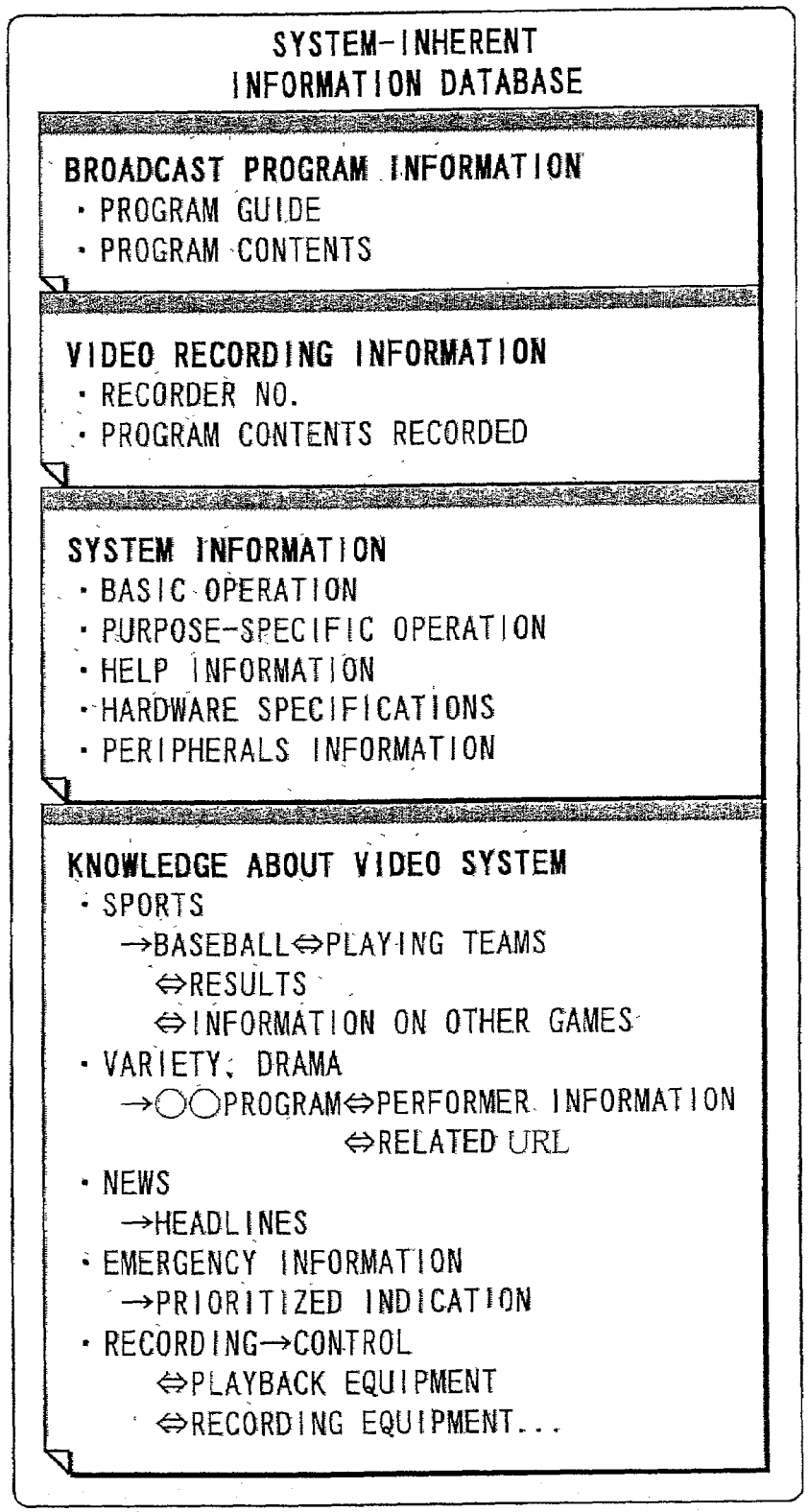
FIG. 11 shows exemplary a system-inherent information stored in a system-inherent information database dedicated to a video system 110.

On the other hand, as shown in FIG. 9, system-inherent information stored in each of system-inherent information databases can be utilized in common among the users A, B, and C, and can be utilized only by the system uniquely associated therewith. That is, the car navigation system 100 can utilize only the system-inherent information unique thereto, and so are the video system 110 and the portable device 120, respectively. For example, FIG. 11 shows exemplary system-inherent information stored in the system-inherent information database for the video system 110. The system-inherent information of FIG. 11 is specific to the video system 110, and includes broadcast program information, video recording information, system information, and knowledge about the video system. Additionally, system-inherent information unique to the portable device 120 includes information such as how to access application servers that provide various information services on networks (such as an information providing service, an e-mail messaging service, and sound/video/game contents distributing services). Each system-inherent information is integrated with various other information every time it is utilized as described above to grow more valuable, and hence grows even more valuable quickly when used by multiple users.

Figure 10:
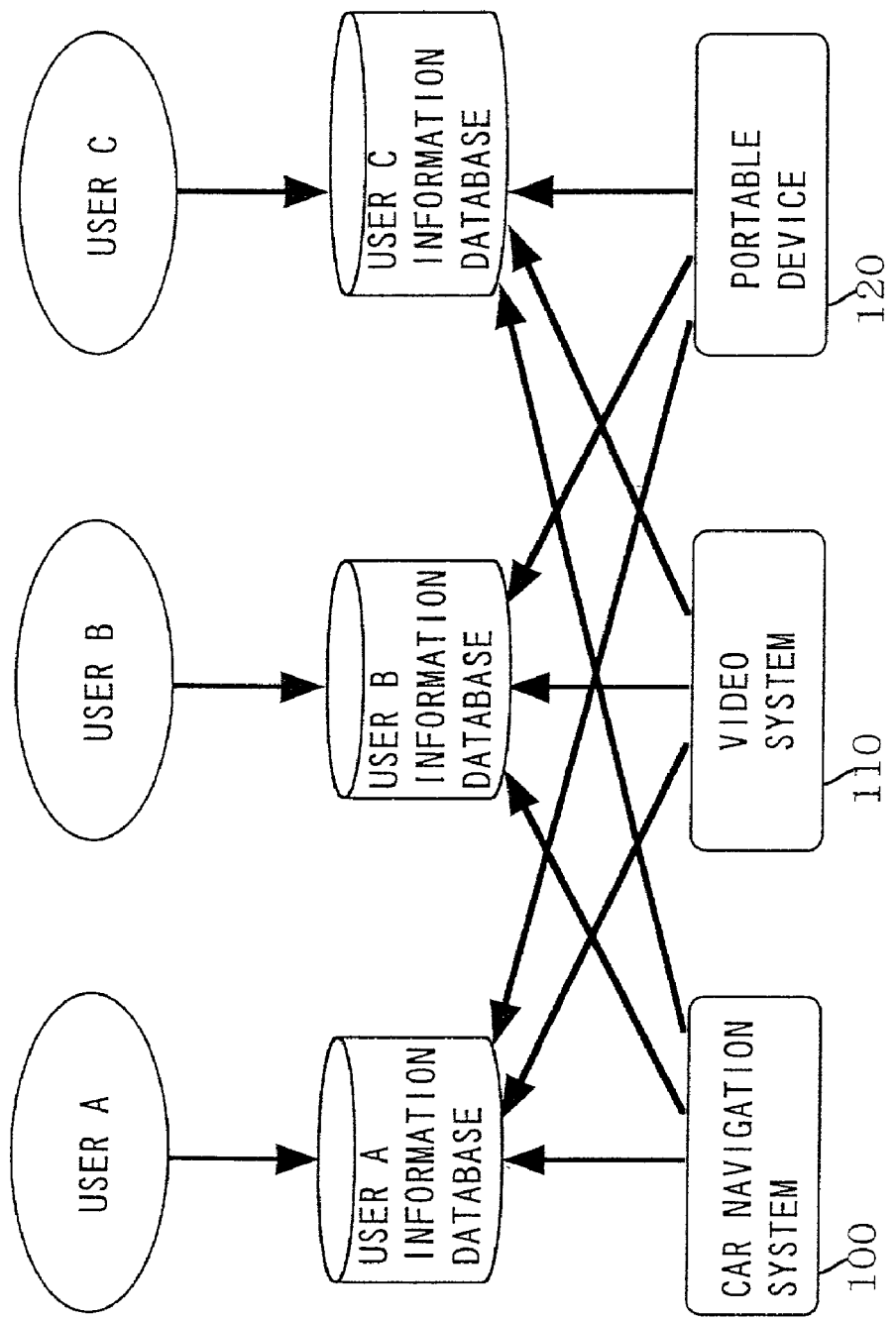
FIG. 10 schematically shows a relationship among the user information, the users, and the applied systems.

On the other hand, as shown in FIG. 10, user information stored in each of user information databases is unique to the user A, B. or C, but can be utilized in common among the car navigation system 100, video system 110, and portable device 120. In addition, the user information, after utilized, for example, by the car navigation system 100, reflects what the user desired to operate the system 100, and such user information can then be utilized by the video system 110 and potable device 120, or vice versa. That is, when the user changes the applied systems over which he utilizes his user information one after another, the user information reflects more of his thinking to grow increasingly valuable to the user's advantage, whereby the user, by utilizing the thus grown user information, can operate the applied systems with gradually improved user-friendliness, flexibility, operability, etc. with which the user could not have operated the applied systems at the initial stage of operation.

The thus grown system-inherent information and user information can be stored in, for example, a detachable memory card common to all the applied systems so that the applied systems can easily utilize, one after another, these information in common. Moreover, in certain embodiments, a database or databases common to all the applied systems may be set up in a server on a network to store the general, system-inherent, and user information therein so that each applied system can acquire necessary information on demand. According to these embodiments, the user can operate the applied systems with improved user-friendliness.

Figure 12:
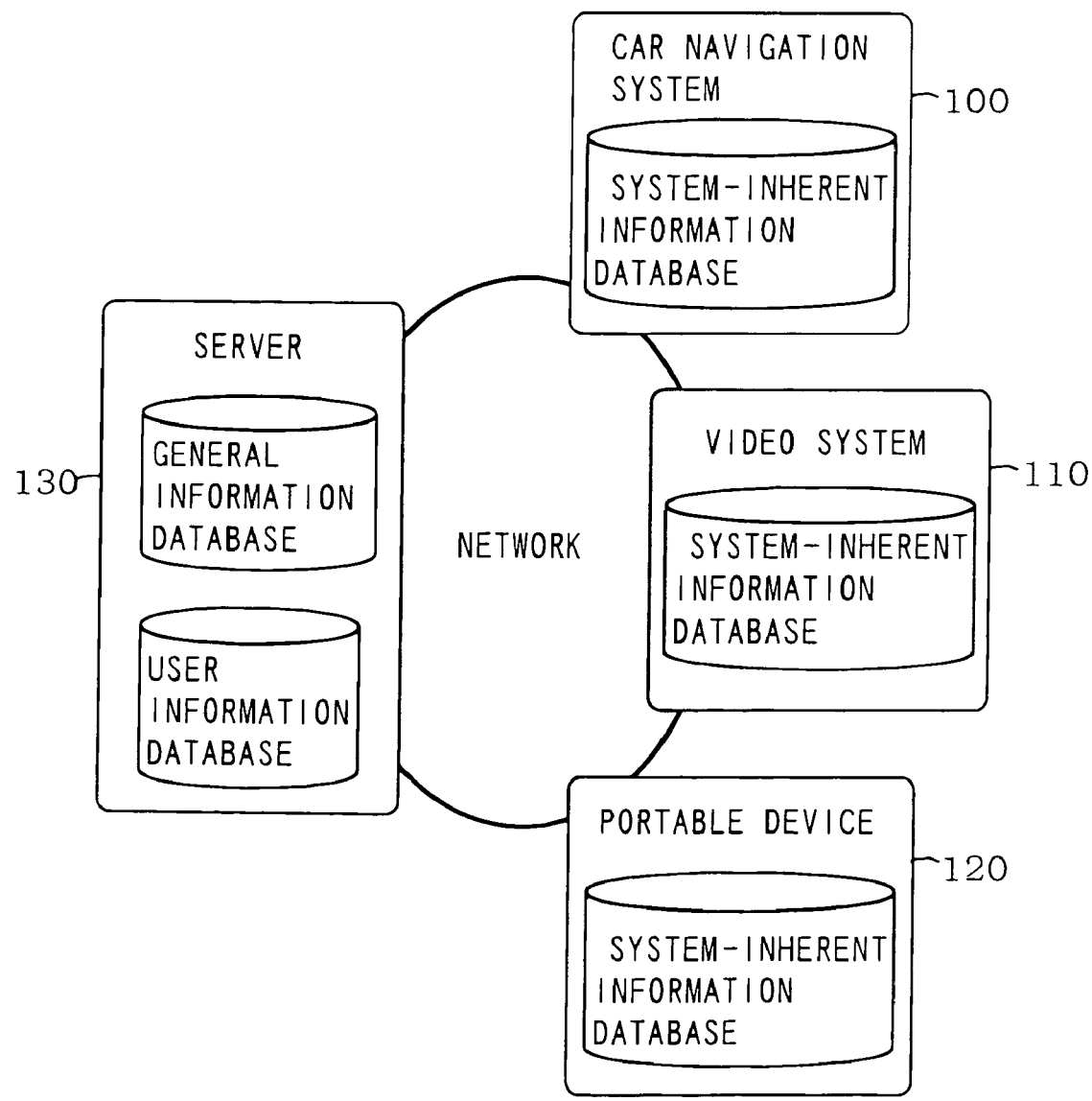
FIG. 12 shows an exemplary configuration in which the car navigation system 100, the video system 110, and a portable device 120 utilize in common the general information and the user information via a network.

FIG. 12 shows an exemplary configuration in which the car navigation system 100, video system 110, and portable device 120 utilize the general and user information in common via a network. In FIG. 12, the car navigation system 100, video system 110, portable device 120, and a server 130 are connected to a network (e.g., the Internet). Each of these applied systems 100, 110, and 120 has its own system-inherent information database, but has neither general nor user information database. Instead, the server 130 has the general information database and the user information database both of which are commonly accessible by these applied systems 100, 110, and 120. In such a configuration, the car navigation system 100, video system 110, and portable device 120 access the server 130 via the network whenever necessary to acquire and utilize the general and user information as their common resources.

FIG. 13 shows how these information are utilized in the configuration of FIG. 12, according to one embodiment. In FIG. 13, the video system 110 establishes a connection to the server 130 via the network in response to an operational command from a particular user. Then, the video system 110, using a browser function or the like, references, for example, family structure information (a wife and two children) included in the user information of that particular user stored in the user information database, and common knowledge (visiting amusement parks for family recreation on holidays) included in the general information stored in the general information database (step S51) to select a special program featuring "Amusement Park A" from broadcast programs included in the system-inherent information stored in the system-inherent information database and suggest that the user view that special program on the screen. When the user selects the special program featuring "Amusement Park A" via a remote controller or the like, the video system 110 directly tunes to that program, or schedule that program for recording, as well as applies a command signal to the server 130 to add the information "Amusement Park A" to his user information (step S52). The sever 130, responsive to this command signal, adds "Amusement Park A" to his user information stored in the user information database as an information of special interest to the user.

Next, the portable device 120 establishes its connection to the server 130 via the network according to a predetermined command from that particular user. Then, the portable device 120 references and recognizes "Amusement Park A," which is of special interest to the user among the user information stored in the user information database using a browser function or the like (step S53), thereafter accesses an application server that provides information over the network based on the system-inherent information to acquire some relevant information about "Amusement Park A" such as its address and special services (issuance of coupons, special parades, etc.) from that application server.

Then, the portable device 120 establishes its connection to the server 130 again via the network to apply to the server a command signal to add the information such as the address of "Amusement Park A" to the user information (step S54). The server 130, responsive to this command signal, adds the address of "Amusement Park A," etc. to the user information stored in the user information database.

The car navigation system 100 then establishes a connection to the server 130 via the network according to a predetermined command from that particular user. The car navigation system 100 references the user information database to check his user information, using a browser function or the like (step S55) to provide the information such as the address and special services of "Amusement Park A." In addition, the system 100 performs the route searching (i.e., the processes 1 through 3 described with reference to FIGS. 3 and 4) which reflects the user's thinking in the user information so far updated. This enhanced route searching is performed for "Amusement Park A," which is the user information, based on the system-inherent information stored in the system-inherent information database, in accordance with a operational command from that particular user. The system 100 also applies a command signal to add new information acquired on the way to "Amusement Park A," if any, to the user information (step S56). The server 130, responsive to this command signal, adds such new information to the user information stored in the user information database, accordingly.

In this way, the user information of that particular user is managed by the server 130 for common use among the car navigation system 100, video system 110, and portable device 120, whereby the minutely updated user information can be utilized in common among the applied systems to improve their user-friendliness. In addition, if the general information is managed centrally by the server 130, the manager of the server 130 can add any new information to the general information database at all times.

In one embodiment, in place of the portable device 120 in the embodiment of FIG. 13, the server 130 may access the application server to acquire the information such as the address and special services of "Amusement Park A" (issuance of coupons, special parades, etc.).

In another embodiment, the video system 110 may utilize the user information updated by the car navigation system 100, unlike in the above embodiment of FIG. 13 in which the car navigation system 100 utilizes the user information updated by the video system 110. For example, the user who is driving the vehicle operates the car navigation system 100 to acquire information about a special fair for a famous artist held by a CD shop or the like around the destination, causes the system 100 to add that information to the user information, then to acquire the URL of a site on the network providing a service of distributing music performed by that artist, and to add the acquired URL to his user information. Thereafter, the user references his user information thus updated by the car navigation system 100, using the video system 110, to acquire the URL of that site, and then downloads and reproduces the music performed by that artist using the video system 110.

In still another embodiment, the system-inherent databases in the configuration of FIG. 12 may be set up in the server 130, so that each of the car navigation system 100, video system 110, and portable device 120 can reference its own system-inherent information on demand. According to this embodiment, each system-inherent information can be utilized in common among multiple users.

In yet another embodiment, every time any of the car navigation system 100, video system 110, and portable device 120 utilizes the general information and/or user information, the applied system in question may utilize such groups of information through downloading from the sever 130 via the network, and whenever such groups of information are updated through the utilization, the applied system in question may upload such updated information to the server 130.

As described in the foregoing, three information groups divided by type into general information, system-inherent information, and user information, are utilized to give operational directions to the information processing apparatus, and the information processing apparatus selects one or more best information from a plurality of input information based on the three information groups, whereby the best information can be selected with flexibility and higher reliability. Additionally, the rankings of the best proposed information can be selected with higher reliability. Moreover, concrete information is added to inputted abstract information, whereby information can be provided, which better responds to the user's needs. Hence, a user can eliminate trouble involved in operating the applied system.

Moreover, the more a user utilizes the applied system incorporating the information processing apparatus, the more the user information reflects the user's thinking to grow increasingly valuable to the user's advantage. By utilizing the thus grown user information, the user can operate the applied system with gradually improved user-friendliness, flexibility, operability, etc. with which the user could not have operated the applied system at the initial stage of operation.

Furthermore, the user information of a particular user, which reflects his thinking while applied to one system, can directly be applied to other systems. Thus, by utilizing such user information in operating various types of applied systems, the user information can be tailored increasingly to the user's thinking according to the features of the applied systems.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2001-94713 filed on Mar. 29, 2001 including the specification, claims, drawings and summary is incorporated herein by reference in its entirety.

What is claimed is:

1. An information processing apparatus incorporated into an applied system comprising:
   an input device for inputting a plurality of information items;
   a selecting device for selecting one or more information items from the inputted information items; and
   a determining device for determining whether or not a difference in a value of appropriateness given to each of the inputted information items is greater than a predetermined value,
   wherein the selecting device narrows the inputted information items down to one or more information items based on at least general information which includes at least any one of common knowledge and expertise and is independent of a user and the applied system, and
   wherein the selecting device performs the narrowing if the difference is not greater than the predetermined value.

2. The apparatus according to claim 1, wherein the selecting device includes:
   a first device for narrowing a plurality of information items down to one or more information items based on the general information;
   a second device for further narrowing a plurality of information items down to one or more information items based on system-inherent information which is independent of the user but dependent on the applied system; and
   a third device for narrowing a plurality of information items down to one or more information items based on user information which includes at least any one of the user's private information, the user's preference information, and the user's action pattern information and is dependent on the user but independent of the applied system,
   wherein the selecting device performs phased narrowing by sequentially using each of the first, second and third devices.

3. The apparatus according to claim 1, wherein the selecting device outputs a command signal to operate the applied system according to the selected information item.

4. The apparatus according to claim 1, wherein the applied system comprises a voice recognition device, and wherein the selecting device selects one or more information items from a plurality of information items provided by the voice recognition device.

5. The apparatus according to claim 1, further comprising:
   a ranking device for ranking the plurality of information items based on at least general information which includes at least any one of common knowledge and expertise and is independent of a user and the applied system.

6. The apparatus according to claim 1, further comprising:
   a deciding device for deciding an operation of the applied system based on the selected information item.

7. The apparatus according to claim 2, further comprising:
   an updating device for updating the user information based on operation conditions of the user of the applied system.

8. The apparatus according to claim 2, wherein the user information is commonly utilized by apparatuses incorporated into applied systems of different types.

9. The apparatus according to claim 2, further comprising:
an updating device for updating the system-inherent information based on changes in environments involving the applied system.

10. The apparatus according to claim 2, wherein the system-inherent information is commonly utilized by apparatuses incorporated into applied systems of the same type, used respectively by different users.

11. The apparatus according to claim 2, wherein one or more of the general information, the system-inherent information and the user information is stored, in part or in whole, in a database managed by a server built on a network commonly accessible by apparatuses incorporated into applied systems, and
the apparatus acquires and utilizes required general information, system-inherent information or user information from the database via the network.

12. The apparatus according to claim 2, further comprising:
an updating device for updating the user information based on operations conditions of the user of the applied system,
wherein the user information is commonly utilized by apparatuses incorporated into applied systems of different type.

13. The apparatus according to claim 2, further comprising:
an updating device for updating the system-inherent information based on changes in environments involving the applied system,
wherein the system-inherent information is commonly utilized by apparatuses incorporated into applied systems of the same type, used respectively by users.

14. An information processing method comprising:
an input process of inputting a plurality of information items;
a selecting process of selecting one or more information items from the inputted information items, and
a determining process of determining whether or not a difference in a value of appropriateness given to each of the inputted information items is greater than a predetermined value,
wherein the selecting process narrows the inputted information items down to one or more information items based on at least general information which includes at least any one of common knowledge and expertise and is independent of a user and the applied system, and
wherein the selecting process performs the narrowing if the difference is not greater than predetermined value.

15. The method according to claim 14, wherein the selecting process includes:
a first process of narrowing a plurality of information items down to one or more information items based on the general information;
a second process of narrowing a plurality of information items down to one or more information items based on system-inherent information which is independent of the user but dependent on the applied system; and
a third process of narrowing a plurality of information items down to one or more information items based on user information which includes at least any one of the user's private information, the user's preference information, and the user's action pattern information and is dependent on the user but independent of the applied system,
wherein the selecting process performs phased narrowing by sequentially using each of the first, second and third processes.

16. The method according to claim 15, further comprising:
an updating process of updating the user information based on operation conditions of the user of the applied system,
wherein the user information is commonly utilized by apparatuses incorporated into applied systems of different type.

17. The method according to claim 15, further comprising:
an updating process of updating the system-inherent information based on changes in environments involving the applied system,
wherein the system-inherent information is commonly utilized by apparatuses incorporated into applied system of the same type, used respectively by users.

18. The method according to claim 14, further comprising:
a ranking process of ranking the inputted plurality of information items based on at least general information which includes at least any one of common knowledge and expertise and is independent of a user and the applied system.

19. The method according to claim 14, further comprising:
a deciding process of deciding an operation of the applied system based on the selected information item.

* * * * *